US011066042B2

(12) United States Patent
Yanagawa et al.

(10) Patent No.: US 11,066,042 B2
(45) Date of Patent: *Jul. 20, 2021

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 389 days.

This patent is subject to a terminal disclaimer.

(21) Appl. No.: 16/306,371

(22) PCT Filed: Jun. 8, 2017

(86) PCT No.: PCT/JP2017/021374
§ 371 (c)(1),
(2) Date: Nov. 30, 2018

(87) PCT Pub. No.: WO2017/213240
PCT Pub. Date: Dec. 14, 2017

(65) Prior Publication Data
US 2020/0324732 A1    Oct. 15, 2020

(30) Foreign Application Priority Data

Jun. 9, 2016 (JP) .............................. JP2016-115596

(51) Int. Cl.
*B60R 22/46* (2006.01)

(52) U.S. Cl.
CPC ................................... *B60R 22/46* (2013.01)

(58) Field of Classification Search
CPC ...................................................... B60R 22/46
See application file for complete search history.

(56) References Cited

U.S. PATENT DOCUMENTS 10,723,311 B2 * 7/2020 Yanagawa ............. B60R 22/405
10,744,975 B2 * 8/2020 Yanagawa ............... B60R 22/46
(Continued)

FOREIGN PATENT DOCUMENTS

JP          2014-500178 A       1/2014

OTHER PUBLICATIONS

International Search Report and Written Opinion issued in corresponding International Application No. PCT/JP2017/021374 dated Sep. 12, 2017.

*Primary Examiner* — Sang K Kim
(74) *Attorney, Agent, or Firm* — Roberts Calderon Safran & Cole P.C.

(57) ABSTRACT

A webbing take-up device is provided with a spool, a first rotor and a second rotor. A webbing to be applied to a vehicle occupant is taken up onto the spool by the spool rotating in a take-up direction. The first rotor is provided to be rotatable together with the spool, includes first engaging teeth with which a moving member that is moved engages, and is rotated when the moving member that is moved engages with the first engaging teeth. The second rotor is provided to be rotatable together with the spool, includes second engaging teeth with which the moving member that is moved engages, and is rotated when the moving member that is moved engages with the second engaging teeth. The second engaging teeth are disposed so as to overlap with the first engaging teeth in a rotation circumference direction of the first rotor.

3 Claims, 9 Drawing Sheets

(56) References Cited

U.S. PATENT DOCUMENTS 10,899,313 B2 * 1/2021 Yanagawa ............... B60R 22/46
2014/0145020 A1 5/2014 Gentner et al.

* cited by examiner

WEBBING TAKE-UP DEVICE

CROSS-REFERENCE TO RELATED APPLICATIONS

The present application is a U.S. National Phase of PCT/JP2017/021374 filed on Jun. 8, 2017, claiming priority to Japanese Patent Application No. 2016-115596 filed Jun. 9, 2016. The disclosure of the PCT Application is hereby incorporated by reference into the present Application.

TECHNICAL FIELD

The present disclosure relates to a webbing take-up device.

BACKGROUND ART

Japanese Patent Application National Publication No. 2014-500178 discloses a webbing take-up device equipped with a pre-tensioner mechanism that takes up a webbing onto a spool by rotating the spool in a take-up direction at a time of emergency of a vehicle. In the pretensioner mechanism recited in Japanese Patent Application National Publication No. 2014-500178, the webbing may be taken up onto the spool by a moving member, which is moved by activation of a gas generator, engaging with plural engaging teeth of a rotor.

In a structure in which a moving member that is moved engages with plural engaging teeth and kinetic energy of the moving member is transferred to a spool, it is crucial to assure the strength of the plural engaging teeth.

SUMMARY OF INVENTION

Technical Problem

The present disclosure provides a webbing take-up device that may assure the strength of an engaging tooth with which a moving member engages.

Solution to Problem

A first aspect of the present disclosure is a webbing take-up device including (i) a spool on which a webbing to be applied to a vehicle occupant is taken up due to the spool rotating in a take-up direction, (ii) a first rotor that is rotatable together with the spool, the first rotor including a first engaging tooth with which a moving member that is moved engages, and the first rotor being rotated as a result of the moved moving member being engaged with the first engaging tooth, and (iii) a second rotor that is rotatable together with the spool, the second rotor including a second engaging tooth with which the moving member that is moved engages, the second engaging tooth being disposed so as to overlap with the first engaging tooth in a rotation circumference direction of the first rotor, and the second rotor being rotated as a result of the moved moving member being engaged with the second engaging tooth.

According to the first aspect described above, when the moving member moves and engages with the first engaging tooth of the first rotor and the second engaging tooth of the second rotor, the first rotor and the second rotor are rotated. Consequently, the spool is rotated in the take-up direction together with the first rotor and the second rotor, and the webbing is taken up onto the spool. In this first aspect, a portion of the second engaging tooth of the second rotor is disposed so as to overlap with the first engaging tooth of the first rotor in the rotation circumference direction (the rotation circumference direction of the first rotor and the second rotor). Thus, the first engaging tooth may be supported by the second engaging tooth and the second engaging tooth may be supported by the first engaging tooth. Therefore, the strength of the engaging teeth with which the moving member engages (the first engaging tooth and the second engaging tooth) may be assured.

In a second aspect of the present disclosure, in the first aspect, a plural number of the first engaging tooth and a plural number of the second engaging tooth are arrayed alternatingly in the rotation circumference direction of the first rotor and second rotor.

According to the second aspect described above, the plural first engaging teeth of the first rotor and the plural second engaging teeth of the second rotor are arrayed alternatingly in the rotation circumference direction. Thus, a number of engaging teeth (the first engaging teeth and the second engaging teeth) with which the moving member can engage may be increased, and the first rotor and second rotor may be rotated promptly when the moving member engages with the engaging teeth.

In a third aspect of the present disclosure, in the first aspect or the second aspect, the first engaging tooth and the second engaging tooth are configured such that an area of overlap between the first engaging tooth and the second engaging tooth in the rotation circumference direction of the first rotor and second rotor becomes smaller toward a rotation radial direction outer side of the first rotor and second rotor.

According to the third aspect described above, the first engaging tooth and second engaging tooth are configured such that the area of overlap in the rotation circumference direction between the first engaging tooth and the second engaging tooth becomes smaller towards the rotation radial direction outer side of the first rotor and second rotor. Thus, resistance when the moving member is engaging with tooth tip sides of the first engaging tooth and the second engaging tooth (the rotation radial direction outer side of the first rotor and the second rotor) may be reduced.

DESCRIPTION OF EMBODIMENTS

Figure 1:
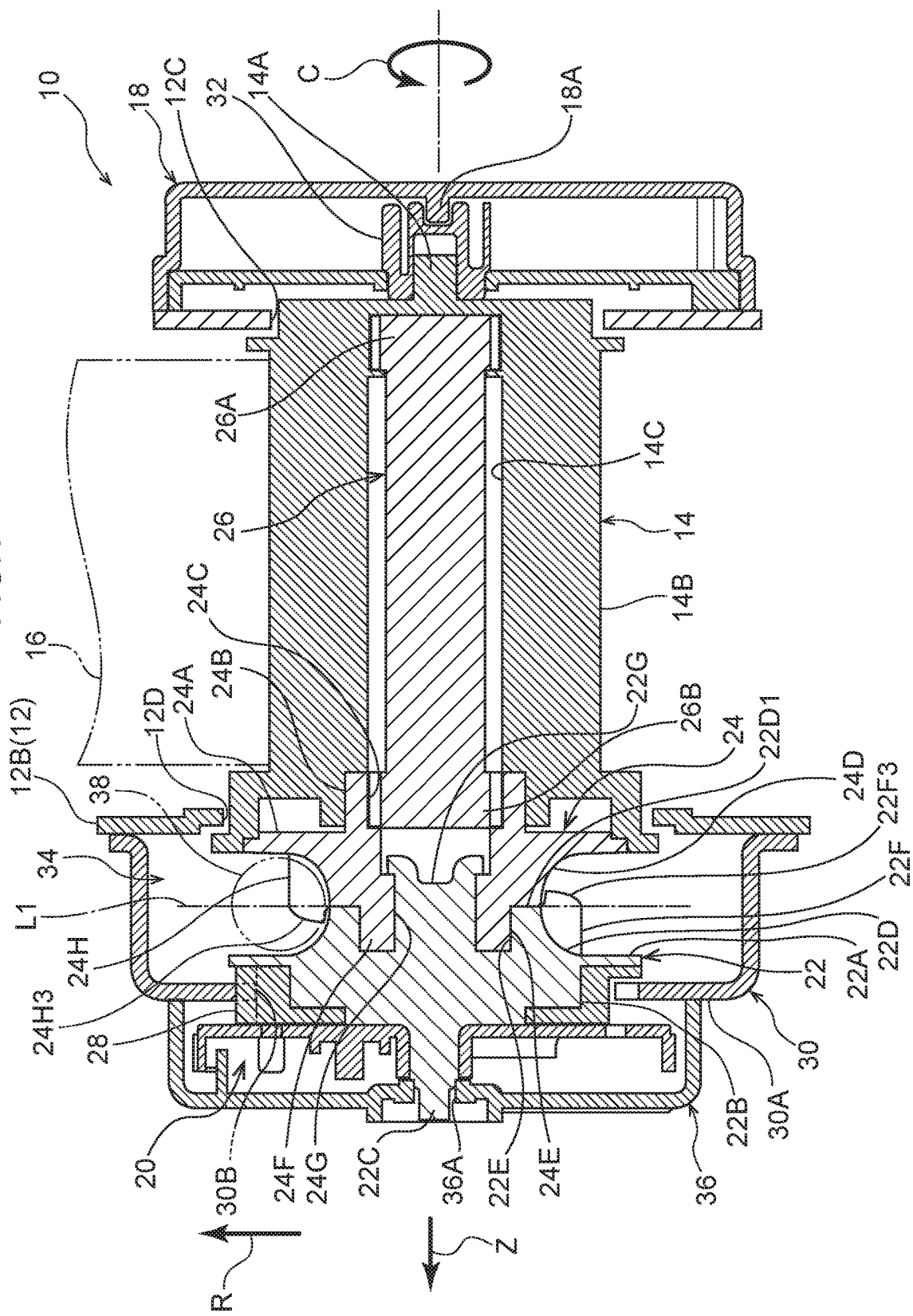
FIG. 1 is a sectional diagram showing a section in which a webbing take-up device according to a first exemplary embodiment is cut along a rotation axis direction of a spool.

A webbing take-up device according to an exemplary embodiment of the present disclosure is described using FIG. 1 to FIG. 4. The directions of arrow Z, arrow R and arrow C that are shown as appropriate in the drawings indicate, respectively, a rotation axis direction, rotation radial direction and rotation circumference direction of a spool. Where simply an axial direction, radial directions and a circumferential direction are referred to below without being particularly specified, these refer to the rotation axis direction, rotation radial directions and rotation circumference direction of the spool.

As shown in FIG. 1, a webbing take-up device 10 is equipped with a frame 12 fabricated of metal. The frame 12 is fixed to a pillar that structures a vehicle body framework of a vehicle, a seat cushion frame that structures a framework of a vehicle seat, or the like. The frame 12 is provided with a leg plate 12A and a leg plate 12B that are disposed to be spaced apart in the axial direction and oppose one another. Circular insertion holes 12C and 12D are formed in the leg plate 12A and leg plate 12B. Portions of a spool 14, which is described below, are inserted through the insertion holes 12C and 12D.

The spool 14 is fabricated of metal and formed in a substantially circular tube shape, the greater part of which is disposed between the leg plate 12A and leg plate 12B of the frame 12. An axle portion 14A is provided at an end portion at another axial direction end side of the spool 14 (the opposite side from the direction of arrow Z). A bearing portion 18A is provided at a spring housing 18, which is described below. The axle portion 14A is supported at the bearing portion 18A via a spiral spring anchoring member 32. The spool 14 is further provided with a take-up portion 14B onto which a webbing 16 is taken up. The webbing 16 is formed in a long, narrow belt shape; a length direction base end portion of the webbing 16 is anchored at the take-up portion 14B. When the spool 14 is rotated in a take-up direction (the direction of arrow C), the webbing 16 is taken up onto the take-up portion 14B of the spool 14, starting from the length direction base end side thereof. When the webbing 16 is pulled out from the spool 14, the spool 14 is rotated in a pull-out direction (the opposite direction to arrow C). A torsion shaft insertion hole 14C is formed in an axial central portion of the spool 14. A torsion shaft 26, which is described below, is inserted into the torsion shaft insertion hole 14C. One axial direction side of the torsion shaft insertion hole 14C is open, and the other axial direction side of the torsion shaft insertion hole 14C is closed off.

A length direction distal end side of the webbing 16 extends from the spool 14 toward the vehicle upper side. The length direction distal end side of the webbing 16 passes through a slit hole formed in a through-anchor (not shown in the drawings) at the vehicle upper side of the frame 12, and is turned back toward the vehicle lower side.

The length direction distal end side of the webbing 16 is anchored at an anchor plate (not shown in the drawings). The anchor plate is formed of a metal plate of steel or the like, and is fixed to a floor portion of the vehicle (not shown in the drawings), a framework member of a seat (not shown in the drawings) corresponding with the present webbing take-up device 10, or the like.

A seatbelt device for a vehicle in which the present webbing take-up device 10 is employed is equipped with a buckle device (not shown in the drawings). The buckle device is provided at a vehicle width direction inner side of the seat at which the present webbing take-up device 10 is employed. In a state in which the webbing 16 is wrapped round the body of a vehicle occupant sitting on the seat, a tongue (not shown in the drawings) provided at the webbing 16 is engaged with the buckle device. Thus, the webbing 16 is applied to the body of the vehicle occupant.

The spring housing 18, which is fabricated of resin, includes the aforementioned bearing portion 18A. The spring housing 18 is provided at an outer face side of the leg plate 12A of the frame 12 (outside the frame 12). A spiral spring (not shown in the drawings) is provided inside the spring housing 18. One end portion of the spiral spring is anchored at the spiral spring anchoring member 32, which is fabricated of resin. The spool 14 is urged in the take-up direction (the direction of arrow C) by an urging force of the spiral spring.

Meanwhile, a lock mechanism 20 is provided at an outer face side of the leg plate 12B of the frame 12 (outside the frame 12). The lock mechanism 20 is provided with a lock base 22 fabricated of metal, which structures a portion of a rotor, and a lock pawl 28 fabricated of metal, which is supported at the lock base 22. The lock base 22 is provided coaxially with the spool 14 at one axial direction side relative to the spool 14. The lock base 22 is linked with the spool 14 via a connecting member 24 fabricated of metal, which structures another portion of the rotor, and the torsion shaft 26. Thus, the lock base 22 can be rotated integrally with the spool 14.

The lock mechanism 20 is equipped with a sensor apparatus (not shown in the drawings). The sensor apparatus is activated at a time of emergency of the vehicle, such as during a collision of the vehicle, during a sudden deceleration or the like. When the sensor apparatus is activated, rotation of the lock base 22 in the pull-out direction (the pull-out direction of the spool 14) is restricted, as is described in more detail below.

A cover plate 30 fabricated of metal is fixed to the leg plate 12B of the frame 12. The cover plate 30 and the leg plate 12B of the frame 12 form a rack accommodation portion 34, in which a large portion of the lock base 22 and the connecting member 24 are disposed.

The cover plate 30 is provided with a plate portion 30A, which is recessed toward the opposite side from the side thereof at which the frame 12 is disposed. The plate portion 30A is disposed to oppose the leg plate 12B of the frame 12 in the axial direction. A ratchet hole 30B is formed penetrating through the plate portion 30A. The lock base 22 of the lock mechanism 20 penetrates through the ratchet hole 30B of the cover plate 30. When the sensor apparatus of the lock mechanism 20 is activated and the lock pawl 28 attached to the lock base 22 moves to the radial direction outer side of the lock base 22, the lock pawl 28 meshes with ratchet teeth of the ratchet hole 30B of the cover plate 30. As a result, rotation of the lock base 22 in the pull-out direction is restricted. Hence, rotation in the pull-out direction of the spool 14 that is linked with the lock base 22 via the connecting member 24 and the torsion shaft 26 is restricted.

The webbing take-up device 10 is also equipped with the torsion shaft 26. The torsion shaft 26 is formed in a rod shape, is accommodated in the torsion shaft insertion hole 14C of the spool 14, and is arranged along the axial direction of the spool 14. An end portion 26A at one side of the torsion shaft 26 is anchored to the spool 14. An end portion 26B at another side of the torsion shaft 26 is anchored at the connecting member 24 and thus linked with the lock base 22. When rotation of the lock base 22 in the pull-out direction is being restricted, a length direction middle portion of the torsion shaft 26 is deformed by twisting. Thus, rotation of the webbing 16 in the pull-out direction of the spool 14 is tolerated.

Now, detailed structures of the lock base 22, which serves as a first rotor, and the connecting member 24, which serves as a second rotor, are described.

The lock base 22 is provided with a lock base-side flange portion 22A formed in a circular plate shape that has a thickness direction in the axial direction and extends in the radial directions. The lock base 22 is further provided with a circular column portion 22B in a substantially circular column shape. The circular column portion 22B protrudes to one axial direction side from the lock base-side flange portion 22A, and a portion at which the lock pawl 28 is to be disposed is cut away from the circular column portion 22B. A rod-shaped shaft portion 22C protrudes to the one axial direction side from an axial central portion of the circular column portion 22B. A lock mechanism accommodating cover 36 is attached to the cover plate 30. The shaft portion 22C is inserted into a bearing hole 36A formed in the lock mechanism accommodating cover 36. Thus, the shaft portion 22C is supported at an inner periphery face of the bearing hole 36A.

The lock base 22 is provided with a lock base-side tubular portion 22D that protrudes to another axial direction side from the lock base-side flange portion 22A. The lock base-side tubular portion 22D is formed such that an outer diameter of a radial direction outer side face thereof decreases toward the other axial direction side. A lock base-side spline 22E in a spline shape is formed at an inner periphery portion of the lock base-side tubular portion 22D. The lock base 22 is further provided with plural lock base-side engaging teeth 22F that serve as first engaging teeth. The lock base-side engaging teeth 22F protrude to the radial direction outer side and the other axial direction side from the lock base-side tubular portion 22D and the lock base-side flange portion 22A, and are arranged at a predetermined spacing in the circumferential direction. A lock base-side core portion 22G is provided at an axial central portion of the lock base-side tubular portion 22D. The lock base-side core portion 22G is formed in a tubular shape with a larger diameter than the shaft portion 22C.

The connecting member 24 is provided with a connecting member-side flange portion 24A formed in a circular plate shape that has a thickness direction in the axial direction and extends in the radial directions. The connecting member 24 is further provided with a torsion shaft engaging portion 24B formed in a circular tube shape. The torsion shaft engaging portion 24B protrudes to the other axial direction side from the connecting member-side flange portion 24A. A spline-shaped torsion shaft engaging spline 24C is formed at an inner periphery portion of the torsion shaft engaging portion 24B. The end portion 26B at the other side of the torsion shaft 26 engages with the torsion shaft engaging spline 24C.

The connecting member 24 is provided with a connecting member-side tubular portion 24D that protrudes to the one axial direction side from the connecting member-side flange portion 24A. The connecting member-side tubular portion 24D is formed such that an outer diameter of a radial direction outer side face thereof decreases toward the one axial direction side. A connecting member-side core portion 24F is provided at an inner periphery portion of the connecting member-side tubular portion 24D. A connecting member-side spline 24E in a spline shape is formed at the connecting member-side core portion 24F. The connecting member-side spline 24E protrudes to the one axial direction side and an outer periphery portion of the connecting member-side spline 24E engages with the lock base-side spline 22E of the lock base 22. An insertion hole 24G is formed in an axial central portion of the connecting member-side core portion 24F. The lock base-side core portion 22G of the lock base 22 is inserted into the insertion hole 24G. The lock base 22 and the connecting member 24 are joined to be integrally rotatable by the lock base-side core portion 22G of the lock base 22 being inserted into the insertion hole 24G of the connecting member-side core portion 24F and the connecting member-side spline 24E being engaged with the lock base-side spline 22E. In the present exemplary embodiment, the distal end portion of the lock base-side core portion 22G of the lock base 22 is crimped (flattened), such that the joining of the lock base 22 with the connecting member 24 will not disengage.

Figure 2:
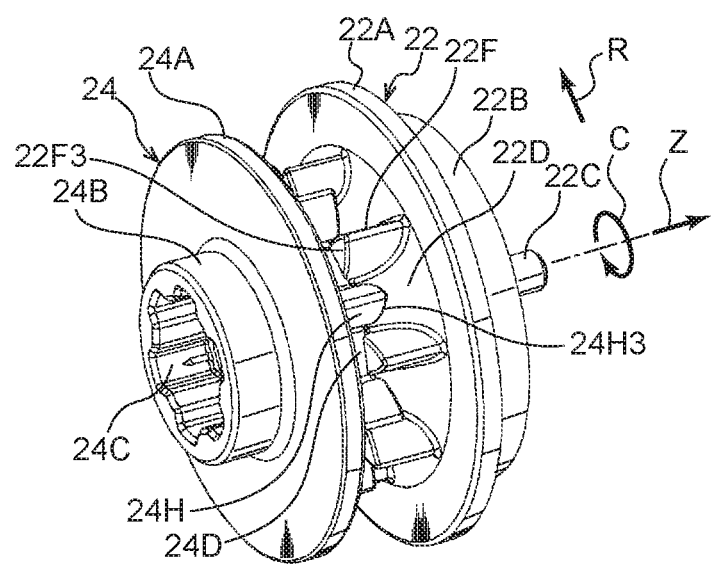
FIG. 2 is a perspective view showing a lock base and connecting member that are integrated.

The connecting member 24 is further provided with plural connecting member-side engaging teeth 24H that serve as second engaging teeth. The connecting member-side engaging teeth 24H protrude to the radial direction outer side and the one axial direction side from the connecting member-side tubular portion 24D and the connecting member-side flange portion 24A, and are arranged at a predetermined spacing in the circumferential direction. As shown in FIG. 2, in the state in which the lock base 22 and the connecting member 24 are joined, the lock base-side engaging teeth 22F and connecting member-side engaging teeth 24H are arranged alternatingly in the circumferential direction and are disposed at equal spacings.

As shown in FIG. 1, a rack 38 that serves as a moving member engages with the connecting member-side engaging teeth 24H and the lock base-side engaging teeth 22F. The rack 38 is formed in a rod shape of a softer material than the lock base 22 and the connecting member 24 (for example, a synthetic resin). The rack 38 is disposed inside a pipe, which is not shown in the drawings. At a time of emergency of the vehicle, the rack 38 is moved inside the pipe and inside the cover plate 30 (inside the rack accommodation portion 34) by pressure from gas generated by a micro gas generator, which is not shown in the drawings, and the rack 38 engages with the connecting member-side engaging teeth 24H and the lock base-side engaging teeth 22F. As a result, the lock base 22 and the connecting member 24 are rotated to one circumferential direction side (the side indicated by arrow C), and the spool 14 that is linked with the lock base 22 and the connecting member 24 via the torsion shaft 26 is rotated in the take-up direction.

Now, details of structures of the lock base-side engaging teeth 22F of the lock base 22 and the connecting member-side engaging teeth 24H of the connecting member 24, which are principal portions of the present exemplary embodiment, are described.

As illustrated in FIG. 1, the lock base-side engaging teeth 22F and connecting member-side engaging teeth 24H are symmetrical about a bisecting line L1 that divides the space between the lock base-side flange portion 22A and the connecting member-side flange portion 24A in half in the axial direction.

Figure 3:
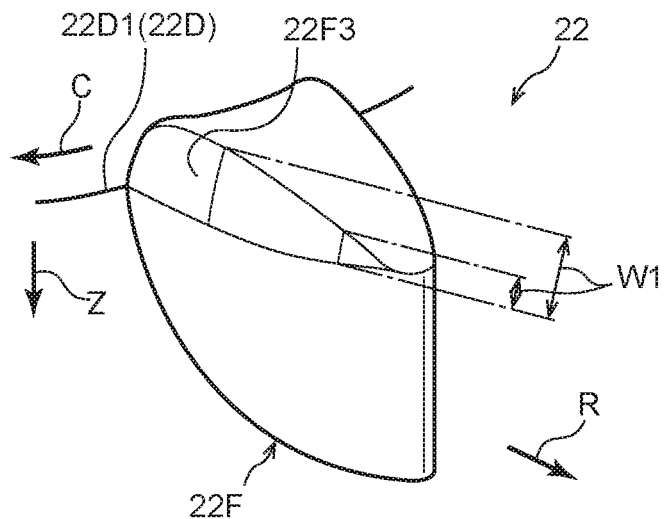
FIG. 3 is an enlarged perspective view showing an enlargement of a lock base-side engaging tooth of the lock base.
Figure 4:
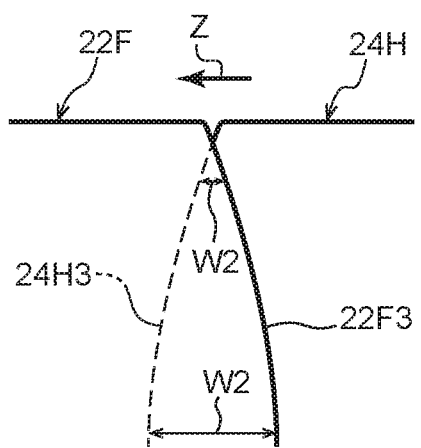
FIG. 4 is a front view in which the lock base-side engaging tooth of the lock base and a connecting member-side engaging tooth of the connecting member are viewed from one circumferential direction side.

As shown in FIG. 1 and FIG. 3, a circumferential direction dimension of each lock base-side engaging tooth 22F steadily decreases toward the radial direction outer side thereof. In addition, a region at the other axial direction side of the lock base-side engaging tooth 22F is formed as a lock base-side protruding portion 22F3 that protrudes toward the radial direction outer side of the connecting member-side tubular portion 24D of the connecting member 24. As shown in FIG. 2 and FIG. 3, the lock base-side protruding portion 22F3 is disposed between two of the connecting member-side engaging teeth 24H, and an end portion at the radial direction inner side of the lock base-side protruding portion 22F3 is disposed close to portions at the radial direction inner sides of the two connecting member-side engaging teeth 24H. Thus, as shown in FIG. 4, the lock base-side protruding portion 22F3 and the connecting member-side engaging teeth 24H overlap (are superposed) in the circumferential direction.

As shown in FIG. 3, a dimension W1 of the lock base-side protruding portion 22F3, toward the other axial direction side from an end 22D1 at the other axial direction side of the lock base-side tubular portion 22D, steadily decreases toward the radial direction outer side. Therefore, as shown in FIG. 4, a dimension W2 in the axial direction of the region of overlap in the circumferential direction between the lock base-side engaging tooth 22F and the connecting member-side engaging teeth 24H steadily becomes smaller toward the radial direction outer side. Thus, an area of the region of overlap between the lock base-side engaging tooth 22F and the connecting member-side engaging teeth 24H in the circumferential direction (areas corresponding to units of distance in the radial direction) steadily becomes smaller toward the radial direction outer side.

As mentioned above, the lock base-side engaging teeth 22F and connecting member-side engaging teeth 24H are formed to be symmetrical about the bisecting line L1 (see FIG. 1). Accordingly, no descriptions are given for the structure of each connecting member-side engaging tooth 24H. The lock base-side protruding portions 22F3 of the lock base-side engaging teeth 22F correspond with connecting member-side protruding portions 24H3 of the connecting member-side engaging teeth 24H. Each connecting member-side protruding portion 24H3 is disposed between two of the lock base-side engaging teeth 22F, and an end portion at the radial direction inner side of the connecting member-side protruding portion 24H3 is disposed close to portions at the radial direction inner sides of the two lock base-side engaging teeth 22F. Thus, as shown in FIG. 4, the connecting member-side protruding portions 24H3 and the lock base-side engaging teeth 22F overlap in the circumferential direction.

Operation of the Present Exemplary Embodiment

Now, operation of the present exemplary embodiment is described.

According to the webbing take-up device 10 according to the present exemplary embodiment as shown in FIG. 1, when the lock pawl 28 meshes with the ratchet teeth of the ratchet hole 30B during a collision of the vehicle, which is a mode of a time of emergency of the vehicle, rotation of the lock base 22 in the pull-out direction (the opposite direction to arrow C) is restricted.

Then, when the micro gas generator, which is not shown in the drawings, is activated during the collision of the vehicle, high-pressure gas generated by the micro gas generator is instantaneously supplied into the pipe in which the rack 38 is disposed. The rack 38 is moved by the pressure of this gas and moves over the outer periphery face of the lock base-side tubular portion 22D of the lock base 22 and the outer periphery face of the connecting member-side tubular portion 24D of the connecting member 24.

When the rack 38 passes over the outer periphery face of the lock base-side tubular portion 22D of the lock base 22 and the outer periphery face of the connecting member-side tubular portion 24D of the connecting member 24, the lock base-side engaging teeth 22F of the lock base 22 and the connecting member-side engaging teeth 24H of the connecting member 24 bite into the rack 38, deforming portions of the rack 38. Thus, kinetic energy of the rack 38 may be transferred to the lock base 22 and the connecting member 24.

When the rack 38 moves in the state in which the lock base-side engaging teeth 22F of the lock base 22 and the connecting member-side engaging teeth 24H of the connecting member 24 are biting into the rack 38, the connecting member 24 and the lock base 22 rotate in the take-up direction (the direction of arrow C) together with the spool 14. Hence, the webbing 16 is taken up onto the take-up portion 14B of the spool 14 and a restraining force on the vehicle occupant from the webbing 16 is increased.

In the state in which rotation of the lock base 22 in the pull-out direction is restricted, when the body of the vehicle occupant pulls on the webbing 16 and a rotary force on the spool 14 in the pull-out direction caused by this pulling force is greater than a torsion withstand load (a deformation withstand load) of the torsion shaft 26, the torsion shaft 26 twists (deforms). Therefore, rotation of the spool 14 in the pull-out direction is tolerated by the twisting of the torsion shaft 26, and pull-out of the webbing 16 from the spool 14 is tolerated. Thus, energy (kinetic energy of the vehicle occupant) corresponding to the amount of pull-out of the webbing 16 from the spool 14 is absorbed by the deformation of the torsion shaft 26.

In the present exemplary embodiment, as shown in FIG. 4, the lock base-side protruding portion 22F3 of each lock base-side engaging tooth 22F with which the rack 38 engages overlaps with the connecting member-side engaging teeth 24H in the circumferential direction, and the connecting member-side protruding portion 24H3 of each connecting member-side engaging tooth 24H with which the rack 38 engages overlaps with the lock base-side engaging teeth 22F in the circumferential direction. Therefore, each lock base-side engaging tooth 22F that is deformed by engaging with the rack 38 may be supported by the connecting member-side engaging teeth 24H, and each connecting member-side engaging tooth 24H that is deformed by engaging with the rack 38 may be supported by the lock base-side engaging teeth 22F. As a result, the strength of the engaging teeth with which the rack 38 engages (the lock base-side engaging teeth 22F and the connecting member-side engaging teeth 24H) may be assured.

Loads that are applied to the lock base-side engaging teeth 22F are braced by the connecting member-side engaging teeth 24H and loads that are applied to the connecting member-side engaging teeth 24H are braced by the lock base-side engaging teeth 22F. Therefore, thicknesses (dimensions in the circumferential direction) of the lock base-side engaging teeth 22F and the connecting member-side engaging teeth 24H may be reduced. In consequence, volumes of biting into the rack 38 by the lock base-side engaging teeth 22F may be reduced, and volumes of biting into the rack 38 by the connecting member-side engaging teeth 24H may be reduced. Therefore, resistance when the rack 38 is engaging with the lock base-side engaging teeth 22F and the connecting member-side engaging teeth 24H may be reduced, and kinetic energy of the rack 38 may be efficiently transferred to the connecting member 24 and the lock base 22. Thus, a reduction in rotary force of the spool 14 when the webbing 16 is being taken up onto the take-up portion 14B of the spool 14 may be suppressed. Accordingly, the output of the micro gas generator may be reduced and the wall of the pipe into which the gas from the micro gas generator is supplied may be made thinner. Consequently, the body of the webbing take-up device 10 may be reduced in size and costs may be lowered.

With a structure in which the lock base-side engaging teeth 22F and connecting member-side engaging teeth 24H that are specified with reduced thicknesses as described above are alternatingly arrayed in the circumferential direction, a number of the engaging teeth (the lock base-side engaging teeth 22F and connecting member-side engaging teeth 24H) with which the rack 38 engages may be increased. As a result, when the rack 38 engages with the engaging teeth, the lock base 22 and the connecting member 24 may be rotated promptly, and an amplitude of rotation speed fluctuations (rotation torque fluctuations) of the lock base 22 and the connecting member 24 may be reduced.

In the present exemplary embodiment, the area of the region of overlap in the circumferential direction between each lock base-side engaging tooth 22F and connecting member-side engaging tooth 24H steadily becomes smaller toward the radial direction outer side. Therefore, resistance when the rack 38 is engaging with regions at the tooth tip sides (radial direction outer sides) of the lock base-side engaging teeth 22F and connecting member-side engaging teeth 24H may be reduced.

In the present exemplary embodiment, an example is described in which the strength of the lock base-side engaging teeth 22F of the lock base 22 and connecting member-side engaging teeth 24H of the connecting member 24 is assured by portions of the lock base-side engaging teeth 22F and portions of the connecting member-side engaging teeth 24H being overlapped in the circumferential direction. However, the present disclosure is not limited thus. For example, the strength of first engaging teeth 40A of a first rotor 40 shown in FIG. 5A and FIG. 5B and second engaging teeth 42A of a second rotor 42 shown in FIG. 6A and FIG. 6B, with which the rack 38 engages, may be assured by portions of the first engaging teeth 40A and portions of the second engaging teeth 42A being overlapped in the circumferential direction.

Figure 5A:
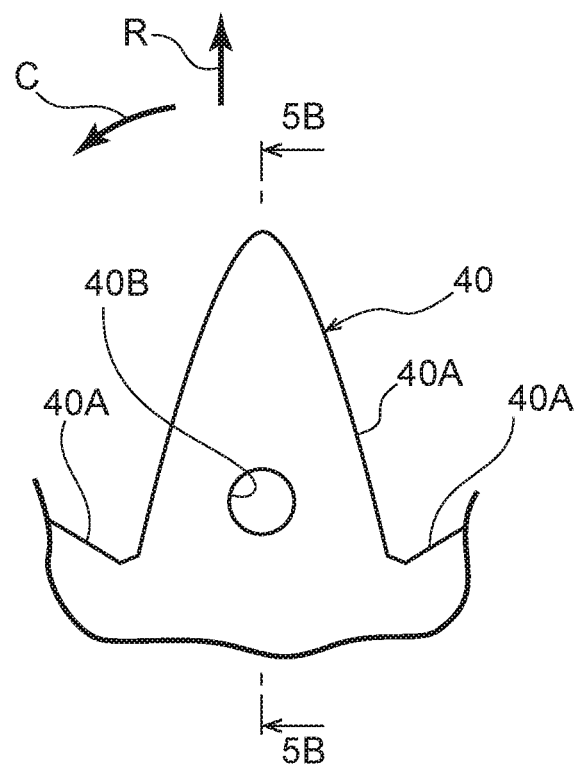
FIG. 5A is a side view showing a first rotor.
Figure 5B:
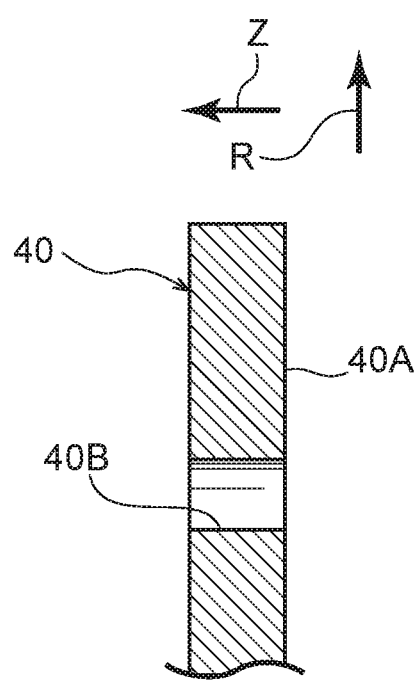
FIG. 5B is a sectional view showing a section of the first rotor cut along line 5B-5B shown in FIG. 5A.
Figure 6A:
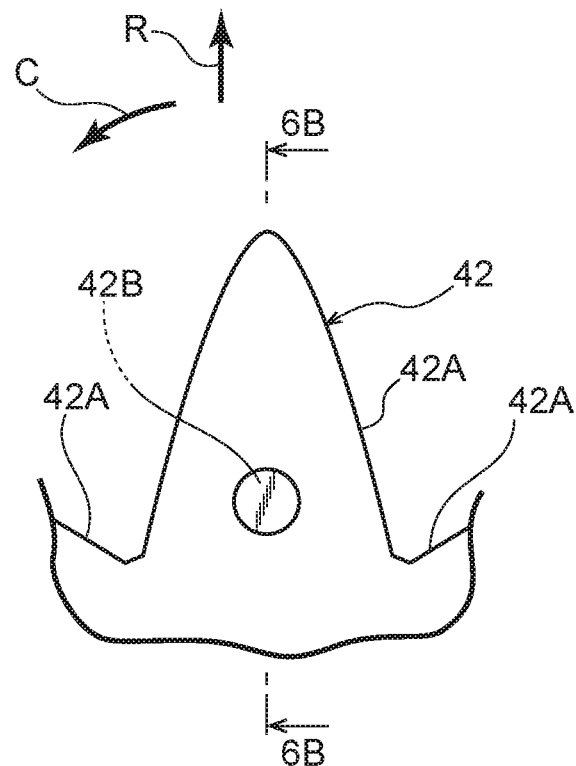
FIG. 6A is a side view showing a second rotor.
Figure 6B:
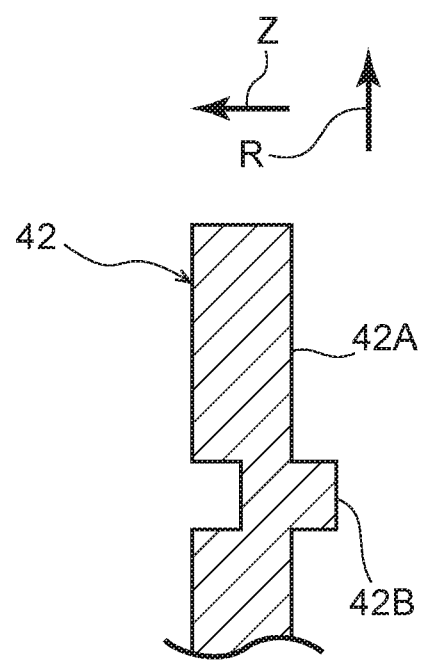
FIG. 6B is a sectional view showing a section of the second rotor cut along line 6B-6B shown in FIG. 6A.
Figure 7A:
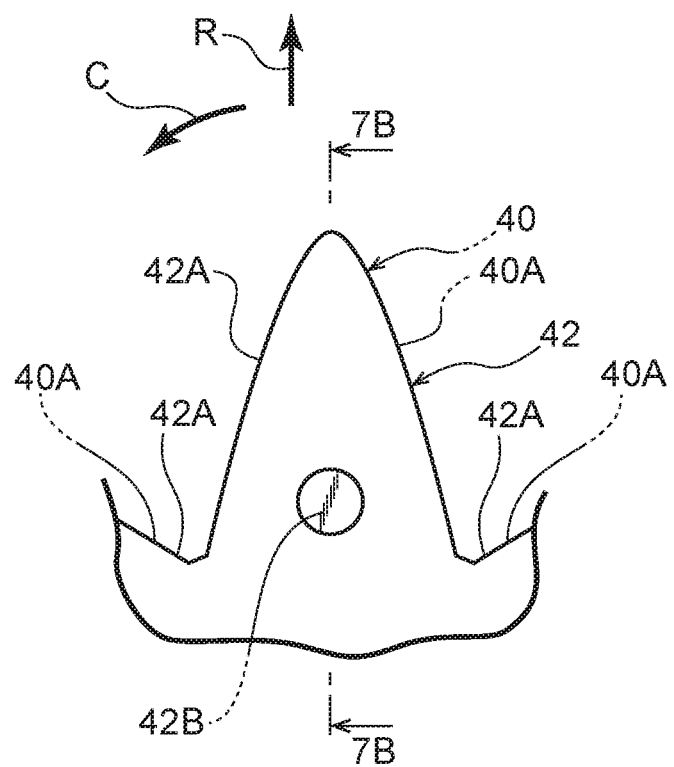
FIG. 7A is a side view showing the first rotor and the second rotor.
Figure 7B:
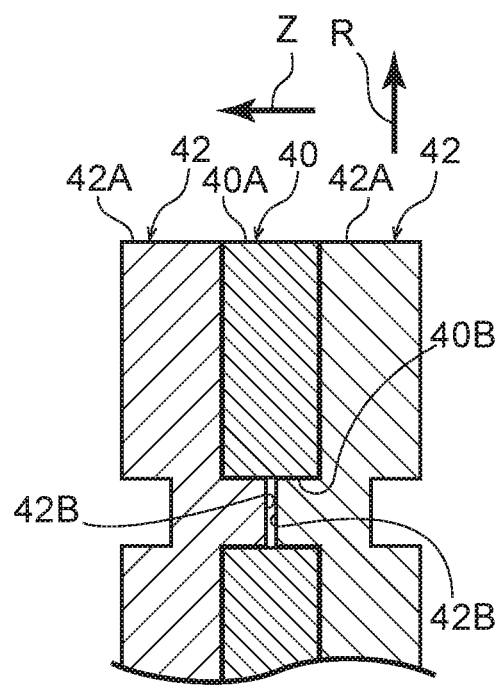
FIG. 7B is a sectional view showing a section of the first rotor and the second rotor cut along line 7B-7B shown in FIG. 7A.

To describe this in more detail, as shown in FIG. 5A and FIG. 5B, a circular penetrating hole 40B is formed at a circumferential direction central portion of a region at the radial direction inner side of each first engaging tooth 40A of the first rotor 40. Similarly, as shown in FIG. 6A and FIG. 6B, a protruding portion 42B that protrudes to an axial direction side is formed at a region at the radial direction inner side of each second engaging tooth 42A of the second rotor 42. As shown in FIG. 7A and FIG. 7B, in a state in which two of the second rotor 42 are disposed at both sides (both sides in the axial direction) of the first rotor 40, the protruding portions 42B of the two second rotors 42 are (for example) press-inserted into the penetrating holes 40B of the first rotor 40. Thus, the first rotor 40 and the second rotors 42 are integrated in a state in which inner periphery faces of the penetrating holes 40B that are portions of the first engaging teeth 40A and outer periphery faces of the protruding portions 42B that are portions of the second engaging teeth 42A overlap in the circumferential direction.

Figure 8A:
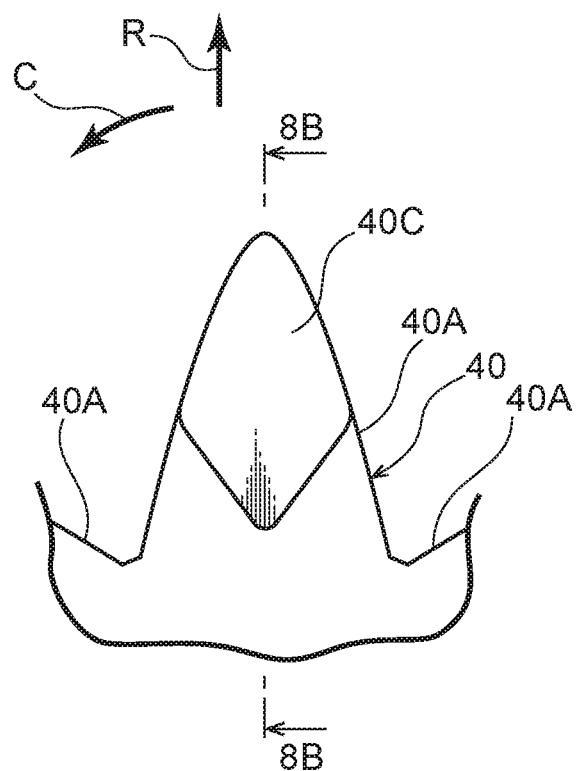
FIG. 8A is a side view showing another first rotor.
Figure 8B:
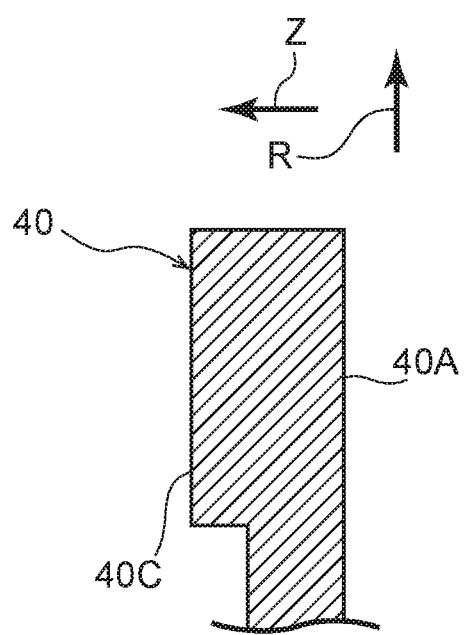
FIG. 8B is a sectional view showing a section of the first rotor cut along line 8B-8B shown in FIG. 8A.
Figure 9A:
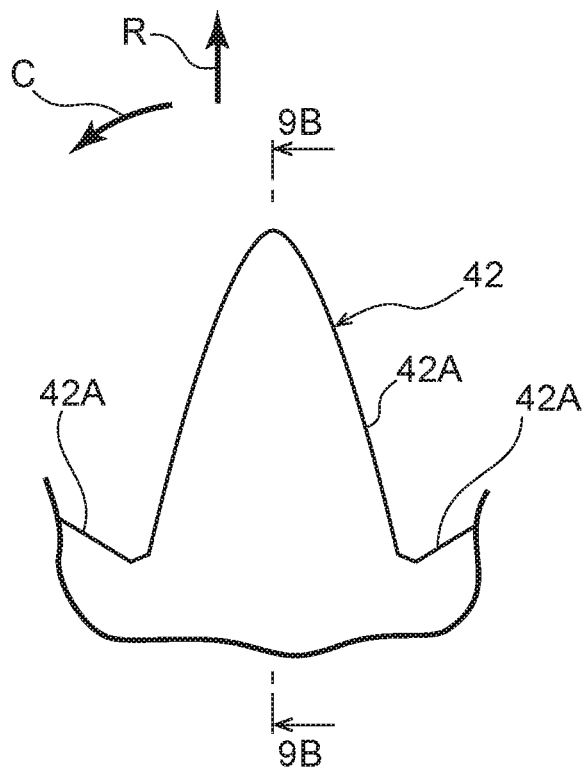
FIG. 9A is a side view showing another second rotor.
Figure 9B:
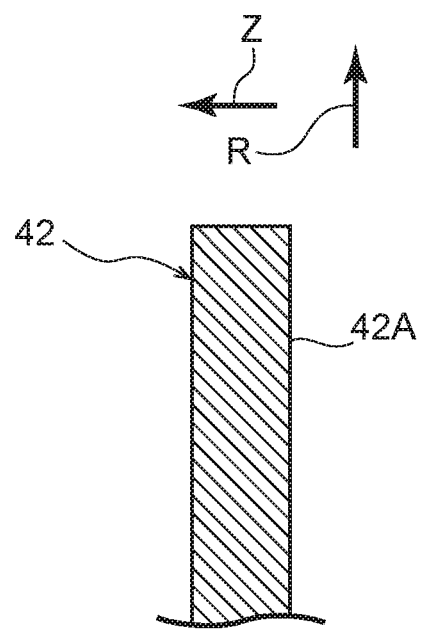
FIG. 9B is a sectional view showing a section of the second rotor cut along line 9B-9B shown in FIG. 9A.
Figure 10A:
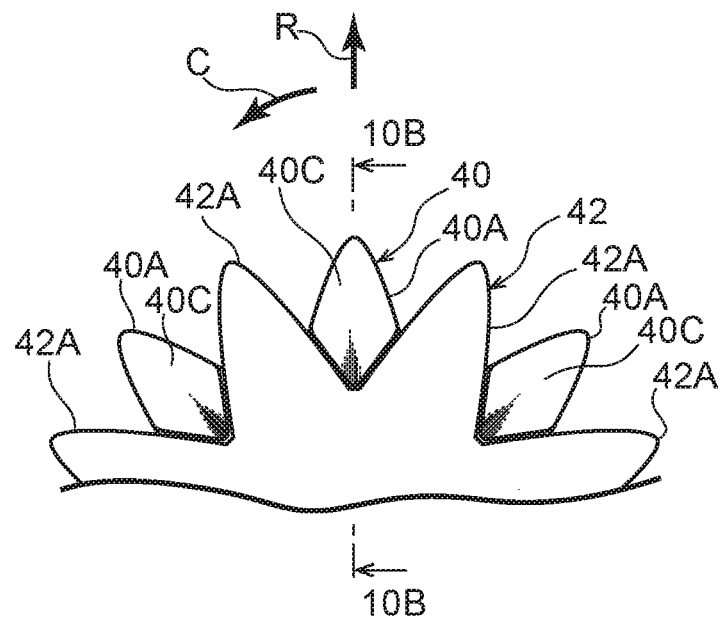
FIG. 10A is a side view showing the first rotor and second rotor, which are integrated.
Figure 10B:
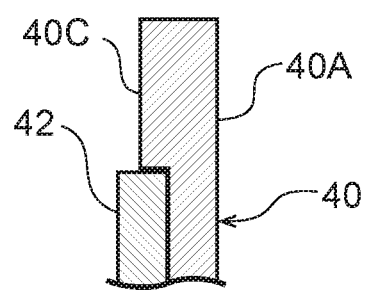
FIG. 10B is a sectional view showing a section of the first rotor and the second rotor cut along line 10B-10B shown in FIG. 10A.

Alternatively, the strength of the first engaging teeth 40A of the first rotor 40 that is shown in FIG. 8A and FIG. 8B and the second engaging teeth 42A of the second rotor 42 that is shown in FIG. 9A and FIG. 9B, with which the rack 38 engages, may be assured by portions of the first engaging teeth 40A and portions of the second engaging teeth 42A being overlapped in the circumferential direction. As shown in FIG. 8A and FIG. 8B, each first engaging tooth 40A of the first rotor 40 is provided with a first rotor-side protruding portion 40C that extends between two of the second engaging teeth 42A of the second rotor 42 shown in FIG. 9A and FIG. 9B. A region at the radial direction inner side of the first rotor-side protruding portion 40C is formed in a shape that corresponds with (fits into) a region at the tooth base side (radial direction inner side) of the second engaging teeth 42A of the second rotor 42. As shown in FIG. 10A and FIG. 10B, in a state in which the first rotor 40 and the second rotor 42 are integrated, regions at the radial direction inner sides of the first rotor-side protruding portions 40C that are portions of the first engaging teeth 40A overlap in the circumferential direction with regions at the radial direction inner sides of the second engaging teeth 42A.

An exemplary embodiment of the present disclosure is described hereabove. However, the present disclosure is not limited by these descriptions and it will be clear that numerous modifications beyond these descriptions may be embodied within a technical scope not departing from the gist of the disclosure.

The disclosures of Japanese Patent Application No. 2016-115596 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A webbing take-up device comprising:
   a spool on which a webbing to be applied to a vehicle occupant is taken up due to the spool rotating in a take-up direction;
   a first rotor that is be rotatable together with the spool, the first rotor including a first engaging tooth with which a moving member that is moved engages, and the first rotor being rotated as a result of the moved moving member being engaged with the first engaging tooth; and
   a second rotor that is rotatable together with the spool, the second rotor including a second engaging tooth with which the moving member engages, the second engaging tooth being disposed so as to overlap with the first engaging tooth in a rotation circumference direction of the first rotor, and the second rotor being rotated as a result of the moved moving member being engaged with the second engaging tooth.

2. The webbing take-up device according to claim 1, wherein a plurality of the first engaging tooth and a plurality of the second engaging tooth are arrayed alternatingly in the rotation circumference direction of the first rotor and second rotor.

3. The webbing take-up device according to claim 1, wherein the first engaging tooth and the second engaging tooth are configured such that an area of overlap between the first engaging tooth and the second engaging tooth in the rotation circumference direction of the first rotor and second rotor becomes smaller toward a rotation radial direction outer side of the first rotor and second rotor.

* * * * *